United States Patent [19]

Hudson

[11] Patent Number: 4,947,383
[45] Date of Patent: Aug. 7, 1990

[54] MACHINE READABLE MARKERS FOR CARTESIAN INFORMATION STORAGE MEDIA

[75] Inventor: Geoffrey Hudson, Victoria, Australia

[73] Assignee: Hudson Allen Limited, Victoria, Australia

[21] Appl. No.: 763,150

[22] PCT Filed: Nov. 8, 1984

[86] PCT No.: PCT/AU84/00228
§ 371 Date: Jul. 8, 1985
§ 102(e) Date: Jul. 8, 1985

[87] PCT Pub. No.: WO85/02284
PCT Pub. Date: May 23, 1985

Related U.S. Application Data

[63] Continuation-in-part of Ser. No. 602,453, Apr. 20, 1984, Pat. No. 4,695,991, which is a continuation-in-part of Ser. No. 403,763, Jul. 28, 1982, abandoned.

[30] Foreign Application Priority Data

Dec. 9, 1980 [AU] Australia .......................... PE6831/80
Nov. 8, 1983 [AU] Australia .............................. PG2272

[51] Int. Cl.$^5$ ............................................. G11B 7/09
[52] U.S. Cl. .................................... 369/44.11; 369/97; 369/44.21; 235/456; 235/487; 235/494
[58] Field of Search ..................................... 369/44-46, 369/59, 93, 97, 112, 119, 120, 125; 360/351, 77, 77.01; 235/494, 456, 454, 476, 487, 488; 250/202, 568, 569, 570, 578; 371/31

[56] References Cited

U.S. PATENT DOCUMENTS

| | | |
|---|---|---|
| 3,072,889 | 1/1963 | Willcox . |
| 3,209,129 | 9/1965 | Sundblad .......................... 235/488 X |
| 3,322,935 | 7/1963 | Wyke et al. . |
| 3,437,793 | 4/1969 | Van Berkel et al. . |
| 3,542,286 | 11/1970 | Binkley et al. . |
| 3,718,914 | 2/1973 | Muller . |
| 3,727,183 | 4/1973 | LeMay . |

(List continued on next page.)

FOREIGN PATENT DOCUMENTS

| | | |
|---|---|---|
| 2758857 | 11/1957 | Australia . |
| 0007660 | 2/1980 | European Pat. Off. . |
| 0018211 | 10/1980 | European Pat. Off. . |
| 0033240 | 8/1981 | European Pat. Off. . |
| 968808 | 9/1964 | United Kingdom . |
| 1117419 | 6/1968 | United Kingdom . |
| 2027963 | 2/1980 | United Kingdom . |
| 82-03698 | 10/1982 | World Int. Prop. O. . |

OTHER PUBLICATIONS

Patent Abstracts of Japan, vol. 6, no. 237 (P-157) (1115) Nov. 25, 1982.
Patent Abstracts of Japan, vol. 1, no. 129, Oct. 25, 1977, p. 5869 E 77.

Primary Examiner—Vincent P. Canney
Assistant Examiner—W. R. Young
Attorney, Agent, or Firm—Cushman, Darby & Cushman

[57] ABSTRACT

An information storage medium in which information is stored as multiple machine readable data entries arranged in frames which are themselves arranged in plural, generally parallel channels. The medium further contains machine readable synchronization markers respectively positioned at the leading ends of the channels. These markers include one or more features of characteristic shape or dimension or are characteristically located on the medium with respect to the associated channels. Preferably the medium further contains a second set of similar markers arranged in respectively groups alongside the respective channels. Also disclosed are a method and apparatus for synchronizing a read head utilizing the storage medium. Further described is a method of observing a succession of machine readable position markers in turn and observed values indicating marker position for a predetermined number of markers preceding each marker being observed, determining whether each observed value is outside a selected trend established by the stored values by more than a predetermined margin, and, if so, reducing the effect of that value.

15 Claims, 9 Drawing Sheets

U.S. PATENT DOCUMENTS 3,780,266 12/1973 Mudsam et al. .
3,795,902 3/1974 Russell .
3,872,445 3/1975 Pease .
3,896,295 7/1975 La Plante .
3,919,697 11/1975 Walker ............................ 360/77 X
3,959,784 5/1976 Meier .
4,074,114 2/1978 Dobras ........................... 235/494 X
4,087,166 5/1978 Rothbart et al. .
4,118,735 10/1978 Wilkinson ........................ 365/124
4,149,269 4/1979 Abe et al. ........................ 365/215
4,198,701 4/1980 Reddersen et al. ............... 365/127
4,213,040 7/1980 Gokey et al. .................... 235/476
4,228,468 10/1980 Nagano et al. .................. 358/280
4,251,126 2/1981 Minoura et al. .................. 350/6.6
4,300,123 11/1981 McMillin et al. ............... 235/456 X
4,328,415 5/1982 Eaton .............................. 235/494 X
4,357,596 11/1982 Feilchenfeld .................... 235/456 X
4,430,563 2/1984 Harrington ...................... 235/456 X
4,439,672 3/1984 Salaman ......................... 235/494 X

MACHINE READABLE MARKERS FOR CARTESIAN INFORMATION STORAGE MEDIA

This application, based on International Patent Application No. PCT/AU84/0028, filed Nov. 8, 1984, is a continuation-in-part of U.S. application Ser. No. 602,453 filed Apr. 20, 1984, now U.S. Pat. No. 4,695,991, which claims priority from Australian patent application No. PG2272, filed Aug. 11, 1983, said application Ser. No. 602,453 being a continuation-in-part of U.S. application Ser. No. 403,763, now abandoned, filed July 28, 1982, which is based on International Patent Application No. PCT/AU84/00188, filed Dec. 9, 1981, claiming priority from Australian Application No. PE6831/80, filed Dec. 9, 1980.

TECHNICAL FIELD

This invention relates generally to information storage media in which information is stored as multiple machine readable data entries arranged in frames which are themselves arranged in plural, generally parallel channels, and which further contain machine readable synchronization markers. The data entries may typically be bits of digital data. In further aspects, the invention is concerned with the reading or observation of the synchronization markers for various purposes including the achievement of synchronization between the reading head and the channels and frames. Finally, the invention provides an arrangement for distinguishing local faults in position indicators from true indications of position errors.

BACKGROUND ART

Applicant's prior international patent application No. PCT/AU81/00188 (International Publication No. WO81/01109) discloses a simple microfiche constituting an information storage medium of the kind in question That application outlines a technique for compensating for fractional misregistration between detector elements of the read head and optically machine readable data entries in the fiche, and also suggests compensation for integral or larger scale misregistration by utilizing characteristic marker patterns among the data entries in the frames.

It is known to synchronize read heads with rows of data entries by means of accurate synchronization markers at the end of each row. In the most basic case, such markers comprise perforations which register with sprocket teeth, but machine readable markers are also employed. It is further known to provide, for synchronization purposes, markers of specific shape among data entries, or characteristic opaque or transparent zones.

The significance of applicant's aforementioned international patent application is that it renders practicable the storage of information on microfiche in optically readable binary format. It is an objective of the present invention to provide a convenient arrangement of synchronization markers which occupies a minimum of possible information storage space and which performs substantially all the principal synchronization functions required. It is a further objective to provide a method of reading information from a storage medium of the kind described.

Even once synchronization has been initially achieved, local faults may arise in the regular position indicators or markers by which synchronization is sustained. Many devices currently exist which need to determine the position of a read head relative to data, but most such devices are read/write in that they can record data as well as read it. Any fault during the writing process may result in mispositioned data and the reading process needs to recognize this possibility. Hence it is common for each position determination to override all previous determinations in an absolute fashion, or if any note of previous determinations is made, they serve only to alert the reading system to the presence of an error.

In the case of magnetic discs, for example, the synchronization pattern along the track (whether before the sector number data or on the servo surface) must normally be complete and accurate for the sector to be accessible. Any fault in the pattern generally results in the sector being unusable.

Similarly the next frame on magnetic tape drives must be observed within a specified period since the last or an error is reported, so that a systematic error in frame positioning such as an incorrect density cannot in general be accommodated.

Such position determination processes as used in the conventional computer context may well be best suited to read/write media. When applied to a read only medium whose production is carefully controlled, such as the optically readable media with which this invention is primarily concerned, they suffer excessive sensitivity to faults arising from spot obliteration such as by dust, medium nonuniformity etc. Reverting to the example above, a single bit fault in the synchronization pattern on a magnetic disc is sufficient to render the entire sector which follows unusable. When a medium is subject to a high number of such spot faults, a new approach needs to be taken to ensure accurate position determination so that local faults or "spot errors" in synchronization markers or patterns, or other position indicators, are distinguishable from more serious system deficiencies and do not render whole segments of data unread or unreadable.

DISCLOSURE OF INVENTION

The invention provides in a first aspect an information storage medium in which information is stored as multiple machine readable data entries arranged in frames which are themselves arranged in plural, generally parallel channels. The medium contains machine readable synchronization markers which are respectively positioned at the leading ends of the channels, and preferably also at intervals along the channels, and which include one or more features of characteristic shape or dimension, or which features are characteristically located on the medium with respect to the associated channels.

In this first aspect, the invention is also directed to an information storage medium in which information is stored in multiple machine readable data entries arranged in frames which are themselves arranged in plural, generally parallel channels, wherein the medium further contains machine readable synchronization markers comprising a first set of similar markers respectively positioned at the leading ends of the channels and a second set of similar markers arranged in respective groups alongside the respective channels.

In accordance with the first aspect of the invention, there is also afforded a method of synchronizing a read head with respect to multiple machine readable data entries arranged in frames which are themselves arranged in plural, generally parallel channels, comprising observing machine readable synchronization markers respectively positioned at the leading ends of the channels, and effecting the aforesaid synchronization by reference to one or more features of the markers which are of characteristic shape or dimension, or which are characteristically located with respect to the associated channels.

Suitable apparatus comprises means to observe machine readable synchronization markers respectively positioned at the leading ends of the channels, and means to effect the aforesaid synchronization by reference to the feature(s) of the markers which is(are) of characteristic shape or dimension, or which is(are) characteristically located with respect to the associated channels. The second mentioned means preferably includes computer means programmed with data concerning said feature(s) and with instructions so as to comprise the second-mentioned means.

In a second aspect, the invention provides a method of observing a succession of machine readable position markers in a medium comprising: observing the markers in turn and storing observed values indicating marker position for a predetermined number of markers preceding each marker being observed; determining whether each observed value is outside a selected trend established by the stored values by more than a predetermined margin; and, if so, reducing the effect of that value.

The selected trend may be initially established by first observing a special marker which is able to be observed with greater confidence in the observation, for example because of repeated observation.

BRIEF DESCRIPTION OF DRAWINGS

The invention will be further described, by way of example only, with reference to the accompanying drawings, in which.

MODES FOR CARRYING OUT THE INVENTION

Figure 1A:
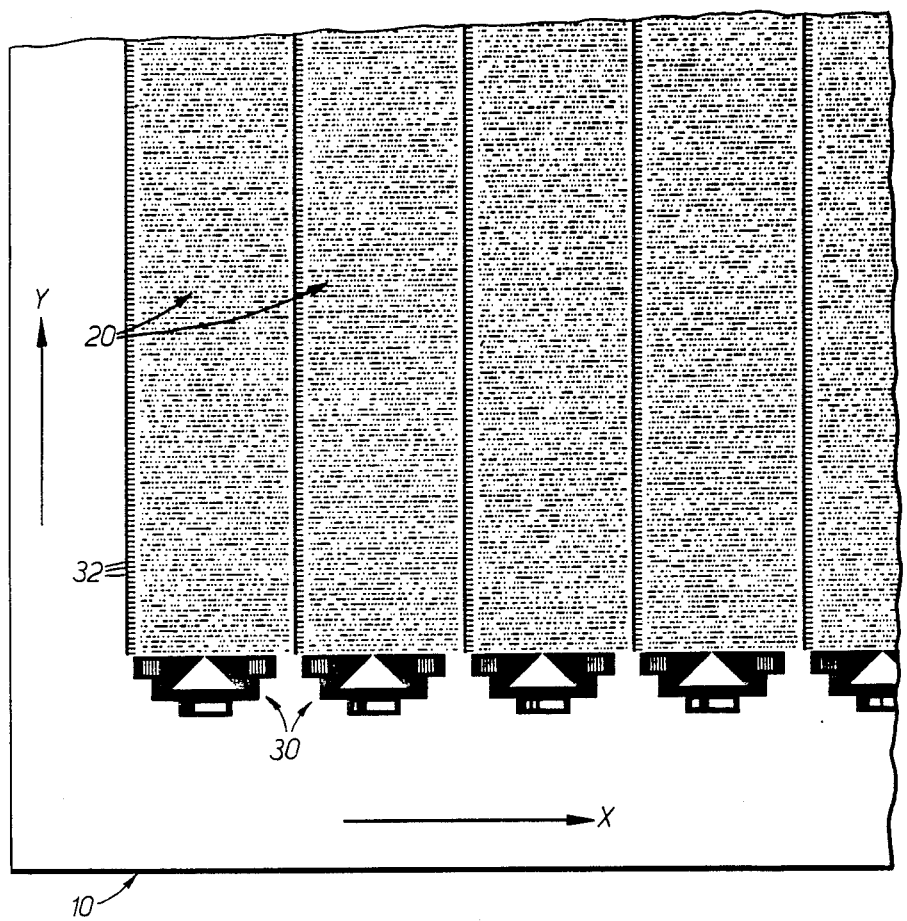
FIGS. 1A and 1B respectively depict in plan a magnified (47×) portion and a smaller further magnified (6×) sub-portion of a microfiche in which information is stored in multiple optically machine readable record entries.

A preferred information storage medium according to the invention is a microfiche in which the information comprises digital data arranged as equi-spaced record entries in a series of linear record frames in one or more parallel channels. The frames extend perpendicularly to the channels and the record entries are indicative of the binary numbers 1 and 0, these comprising the limited set of possible values. Hence the record entries, which in the exemplary fiche may comprise spots of substantially variable opacities, typically translucent and opaque spots, will herein be referred to as bits. It is to be emphasized that none of these specific features constitute limitations on the ambit of the invention. For example, the record entries might be spots of magnetization or transitions from one value of opacity, or one magnetic field intensity or direction, to another, and a cartesian arrangement of the data, while presently thought to be optimal, is certainly not mandatory.

In a practical microfiche prepared along the above lines, the data may typically be arranged so that each channel is about 600 micron wide and comprises 7 longitudinal segments of about 9 mm each containing 800 frames of data bits. Each frame is 6 micron wide and each spot 6 micron in diameter at centres 6 microns apart. The frames are separated by a gap of, say, 12 micron. The microfiche may be, e.g., a silver halide master or a diazo copy thereof.

Figure 1B:
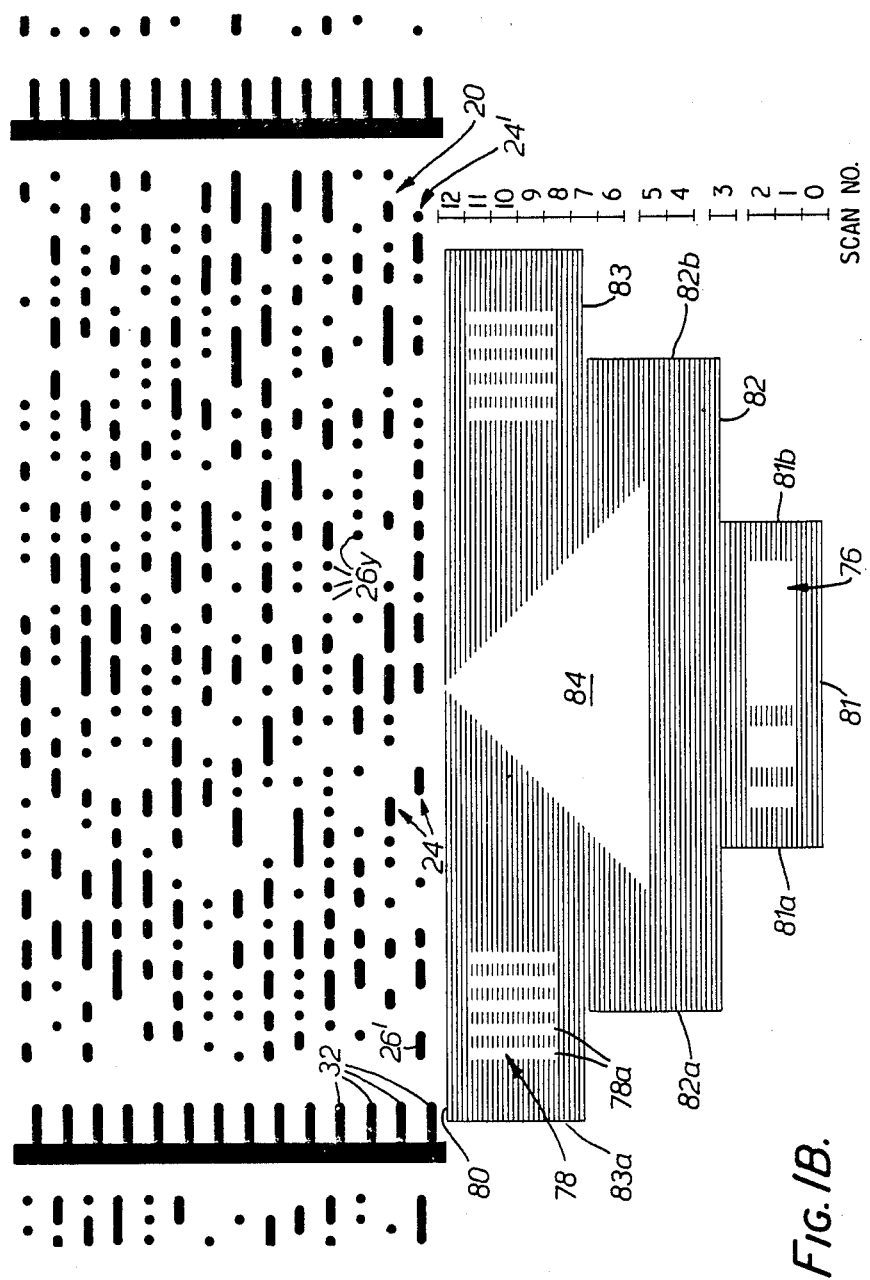

An illustration or photograph of a microfiche thus envisaged cannot be very informative as to detail. FIGS. 1A and 1B respectively illustrate a magnified (47×) portion and a smaller further magnified (6×) sub-portion of a representative fiche 10 on which data bits 26 are arranged in parallel channels 20 extending in the "Y" direction, each divided into blocks or segments of groups of parallel frames 24 extending in the "X" direction. One of the possible values of the parallel bits, say 1, is positively indicated by a translucent "spot", but adjacent spots merge to form translucent bars. The other value, 0 in the example, is indicated by sustained opacity at the regular site for the bit.

The start ends of each channel block, and therefore also the start of the channel, are preceded by a respective specially configured position indicator in the form of a channel synchronisation marker 30, having certain prescribed relationships to the respective channel segment in accordance with the first aspect of the invention. Each frame 24 is associated, in a prescribed spatial relationship according to a preferred feature of the first aspect of the invention, with its own position indicator comprising synchronisation marker 32. Markers 30 are all geometrically similar, as are markers 32. Markers 32 for each frame are connected by joining the Y-direction bars of the markers as a long, straight bar. The nature and use of these markers will be reverted to subsequently, being depicted in greater detail in FIGS. 1B and 6 respectively.

Fiche 10 is conveniently read by scanning along each channel in turn with a linear detector comprising multiple detector elements. A single detector might of course scan along each frame and thereby read each data bit in turn but it is much preferred to utilise a linear array of detector elements of span greater than a frame and so simultaneously read all bits of each frame in turn. It is also desirable for the purposes of the first aspect of the invention that each record entry is at least partly within the field of observation of at least one detector element. A suitable such detector is a multiple element photosensitive line image sensor designed for optical imaging at high sensitivity and speed. Such a sensor is typically associated with a charge-coupled device by which the charge state of each element is passed via a transfer gate to analog shift registers which store that charge and then transport it to the output stage when required. This transport operation generally proceeds at constant speed so that the time at which a value is read bears a known relationship to the position of the respective detector element along the array.

An example of a commercial detector of this type is the Fairchild CCD 111, manufactured by the Fairchild Camera & Instrument Corporation of Palo Alto, Calif. The CCD 111 has 256 photosensitive detector elements in linear array, each element being of rectangular configuration in the plane of the array.

Figure 2:
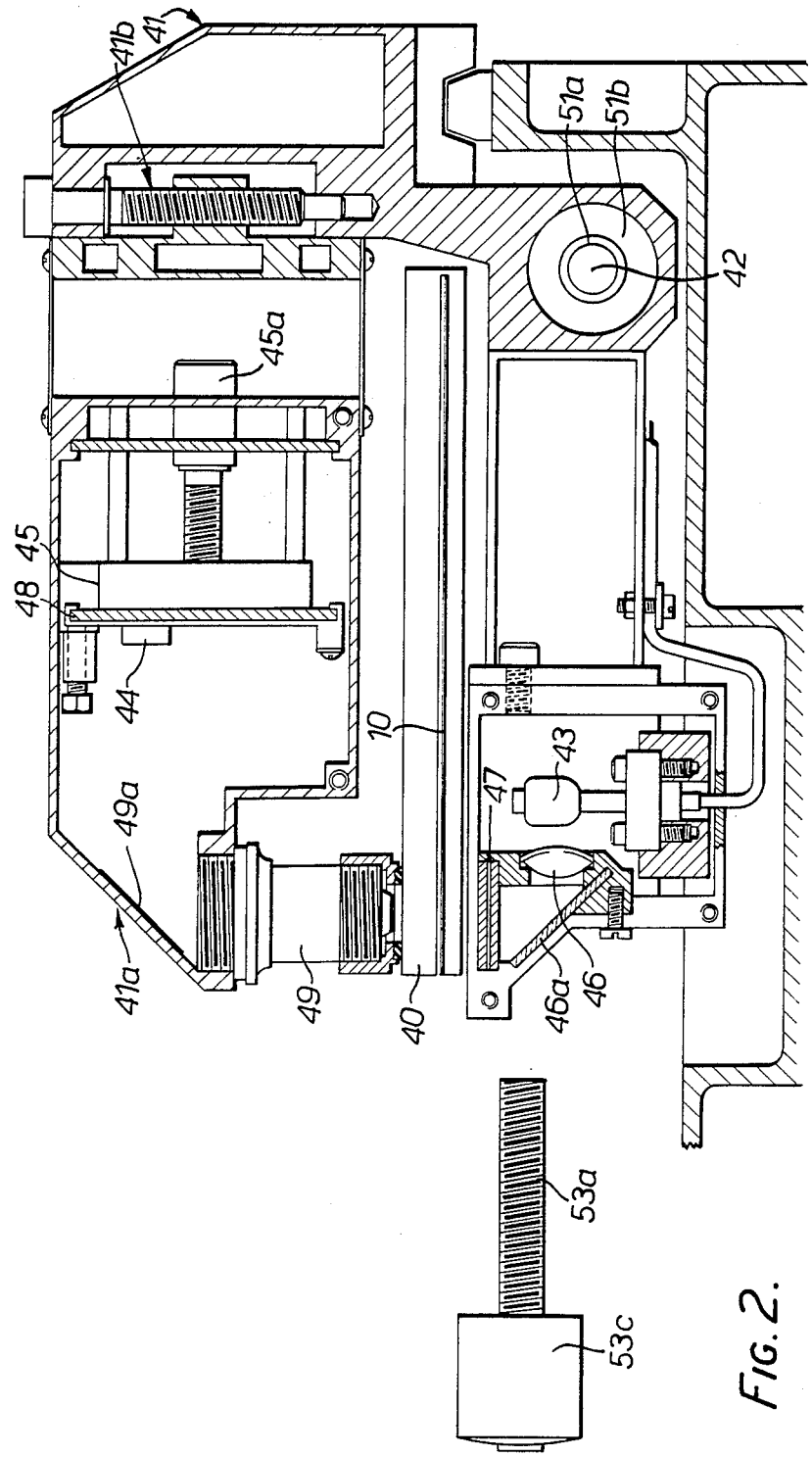
FIG. 2 schematically depicts a simple arrangement for reading the fiche shown in FIGS. 1A and 1B.

FIG. 2 schematically depicts a reader arrangement showing the principal components. Microfiche 10 is held in a glass platen 40 which moves from left to right and vice-versa while the illumination and optics assembly 41 (including read head 41a) moves on an axis 42 perpendicular to the paper. The illumination system comprises a bulb 43, a condensing lens 46, a mirror 46a to allow the illumination system to take less space, and filters 47. The light passes through platen 40 and fiche 10 and into a focussing lens 49, thence via another mirror 49a onto the photosensitive detector 44. That detector is served partly by other electronics mounted on the same printed circuit board 48 as the detector, and by other circuits not shown. Detector 44 is mounted to a carriage 45 which is movable for focus adjustment by a manual drive 45a. The whole read head 41a, housing lens 49, detector 44, carriage 45 and drive 45a is mounted at 41b for adjustment to and from platen 40.

Movement of platen 40 and assembly 41 is effected by separate drives comprising respective screw and nut mechanisms each powered by a suitable electric motor. The screw 51a and ball-race nut 51b of the mechanism for assembly 41 are visible in FIG. 2, which also shows in the left inset the electric motor 53c and screw 53a for platen 40. The axis of screw 53a is of course parallel to but out of the plane of the rest of FIG. 2.

It will be seen that the two drives are operable to selectively relatively move read head 41a relative to the fiche in either or both of two mutually perpendicular directions, parallel to the channels and parallel to the frames, so that the read head may scan each frame in turn, channel by channel. An alternative drive would be an inelastic wire or band wound around a drum connected to a motor. It is preferred that the drive relatively moves the microfiche at substantially constant velocity parallel to the data channels and perpendicularly to the frames, but in a stepwise motion parallel to the frames and perpendicular to the channels.

In use, the array of detector elements comprising detector 44 is exposed by the optics including lens 49 to light filtered by each frame in turn and so temporarily stores a charge in each of its constituent elements directly representative of the light intensity on that element from within a defined field of observation for the element determined by the location of the element within the sensor, the location of fiche 10 and the sensor 44, and the location and properties of lens 49 and the mirror 41a. The device thus has the property that each constituent detector element responds to each record entry within its field of observation in relation to the fraction of the record entry lying within the field of observation of the respective detector element.

Figure 3:
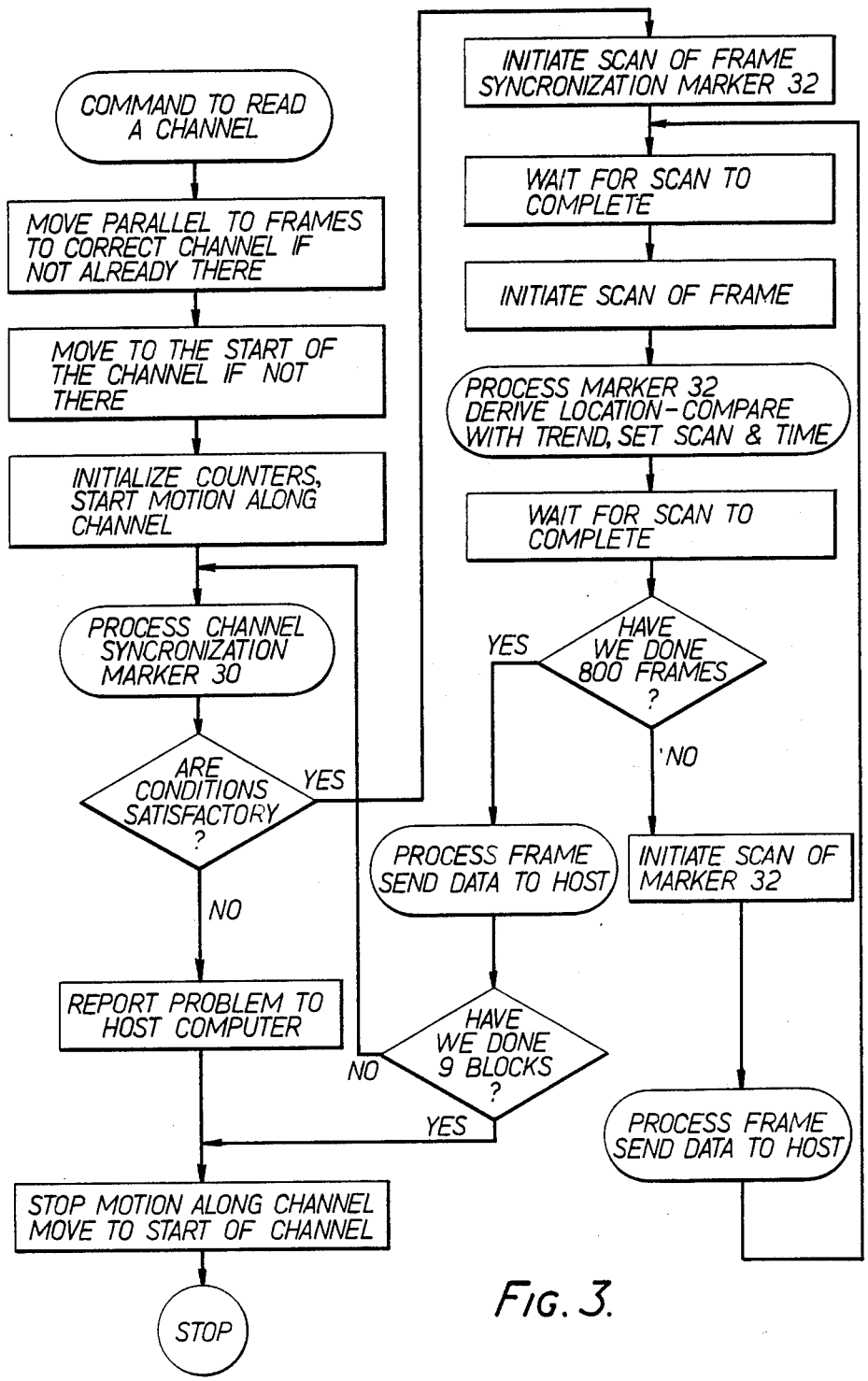
FIG. 3 is a flow diagram for the principal steps in scanning and reading a channel of the fiche.

FIG. 3 is a simple flow chart outlining the sequence of steps executed by the reader arrangement as it scans, reads and analyses the information on the fiche. The first stage of such action will be to position the read head 41a at the start of the desired channel 20, and to start a relative motion of the channel passing under the read head. Next a marker 30 will be encountered. The examination of such markers, which is the subject of the first aspect of the invention and will be further detailed shortly, will typically involve a number of scans of the fiche by the photosensitive array, yielding the position of the array relative to the channel to a high level of confidence, and the relative orientation or skew of the read head with respect to the channel, the range of detector outputs likely to be observed, perhaps in terms of optical magnification, the standard of focus, and the velocity of the channel relative to the read head. If one or more of these parameters are such that correct data extraction cannot be achieved then the mechanical system will be instructed to move the microfiche to the start of the channel and the problem will be reported to the host (micro) computer.

If conditions are found satisfactory, the read head moves relatively forward and scans the first of the markers 32 and then the first frame of the channel. PROCESS MARKER 32 is the subject of a preferred feature of the first aspect of the invention and is further described below. PROCESS FRAME may, for example, be effected according to the technique disclosed in International Patent Application No. PCT/AU81/00188 (International Publication No. WO81/01109)

With reference to FIG. 1B, each marker 30 comprises, for example three juxtaposed centred horizontal bars which together constitute a transparent zone save for three relatively opaque sections being a triangular zone 84 with its apex at the broad edge 80 of the marker, a group 78 of vertical lines 78a at the left and right ends of the widest horizontal bar, and a number for the associated channel block or segment, encoded in 12 vertical lines 76 centred in the lower and most narrow horizontal bar. Each of the 12 vertical lines 76 is wider than the lines 78a at the ends of the upper bar and is either opaque or transparent depending on whether it represents a 0 or a 1. In FIG. 1B, the transparent zone of the marker is indicated by multiple discrete parallel lines. This representation is only to facilitate illustration: there would not normally be any such lines in practice.

Marker 30 is 512 microns wide along edge 80, and 192 microns wide at its narrow leading edge 81. The first step 82 is 96 microns wide while the second step 83 is 64 microns wide. The detector elements observe a section of the fiche 3 microns long in the X-direction, so that the edges 81 and 82 cover 64 and 32 detectors respectively. In the normal course of events, the optics head 41 would be positioned so that the detector array observed an area spanning the full width (512 microns) of the marker 30, and would make 13 observations of the marker, each up to 15 microns in the Y direction, as the marker passed below it.

It will be appreciated that the specific dimensions just quoted are exemplary only, that a wide variety of dimensions, both absolute and relative, could be used.

The edges of markers 30 are positioned precisely with respect to the associated channel segments and they comprise features of the markers which are characteristically located on the medium with respect to the channels. In particular, edges 80, 81, 82, 83 are parallel to and at respective predetermined distances, common to all markers, from the centre line of the first frame 24' of the channel, while side edges 81a, 81b; 82a, 82b; 83a, 83b are parallel to the channel at predetermined distances, parallel to the first frame and also common to all markers, from the first record entry or data bit 26' of that frame. For example, edge 80 is typically 15 microns from the centre line of frame 24', and edge 83a is 39 microns left of the centre of the first bit position in the frame 24'. The 15 micron separation allows the microprocessor adequate time to establish the initial trend for practising the second aspect of the invention: this is disclosed in greater detail below. It will be noted each of the edges 80, 81, 82, 83, 81a, 82a, 82b has a length at least three times the extent of a data entry parallel to the respective edge.

Triangular zone 84, line groups 78 and number lines 76 comprise characteristically shaped features of each marker 30. As will be seen, zone 84 is also of a characteristic size or dimensions in both X and Y directions, while line groups 78 and number lines 76 have characteristic dimensions in one direction.

Figure 4:
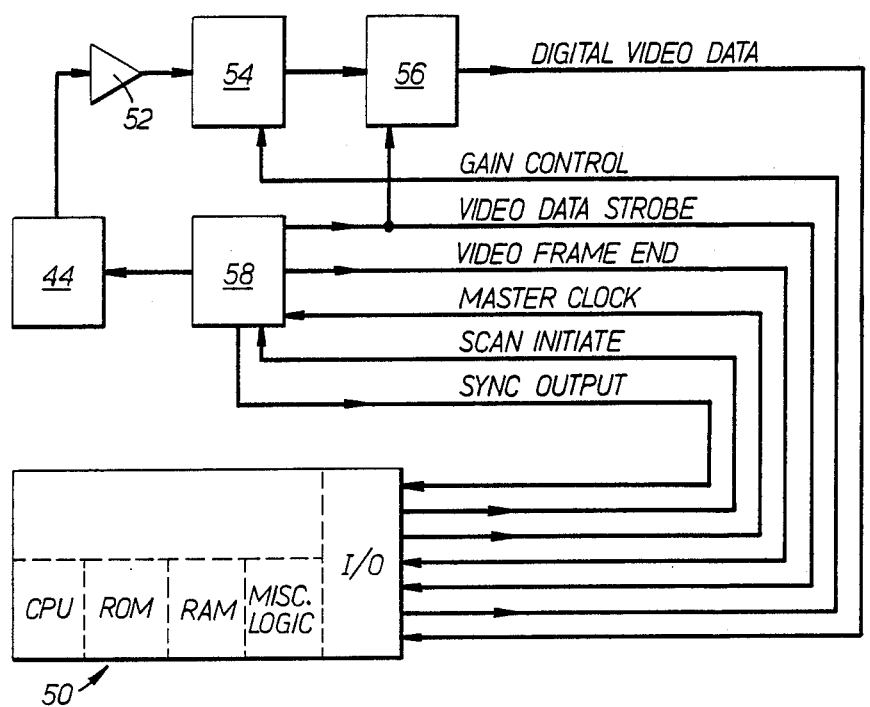
FIG. 4 is a block circuit diagram of an arrangement for practicing the invention under microprocessor control.

A suitable control and analysis circuit for scanning and utilizing marker 30 is a digital microprocessor circuit of the form shown in FIG. 4, programmed with particulars of the aforementioned predetermined distances characterizing the marker and with other useful data concerning the markers. Alternatively, it would be possible to employ a hardwired logic circuit equivalent to the microprocessor program. In either case, the circuit may of course also be used in the scanning and interpretation of the frame synchronization markers 32 and of the frames 24.

The circuit of FIG. 4 is a substantially standard configuration according to well-established principles of microprocessor control. The microprocessor itself 50 has the usual constituents: a CPU, for example a M6809, ROM and RAM modules, examples being 2732 and 6116, and an I/O interface such as 6522 VIA. Raw analog data from the photosensitive charge-coupled detector 44 is fed via a buffer 52 and level shift/clamp and gain control 54 to a 4-bit analog-digital flash converter (ADC) 56, then to microprocessor 50. Microprocessor 50 generates a master clock signal which initiates each scan by the read head, and during the scan the regular successive presentation of the outputs resulting from the previous scan. A timing unit 58 comprises a simple set of counters (for example Motorola LS197), with a pulse generator which generates the pulses required for each output from a quartz crystal in any of the usual fashions. The respective control timing signals output and input to processor 50 are indicated in FIG. 4. In this arrangement, the binary digits representing the output of each detector element will be stored in successive memory locations by direct memory access during the read out of the currently stored scan.

As explained earlier each scan comprises simultaneous exposure of the whole scan width to a photosensitive charge-coupled detector element array. The detector element values are digitized and transferred to system memory, and a pointer then serially accesses the values in memory. Marker related readings indicated as single value tests are generally computed from the output values of 2 or more detector elements.

The functions achieved in relation to marker 30 may be summarized by reference to FIG. 1B which indicates those transverse segments successively observed by the scans numbered 0 to 12. The line segmenting and numbering the scans in FIG. 1B is not of course part of the actual fiche but is included in the drawing for purposes of explanation. Various measurements (of X location, Y location, Yaw angle, Illumination, Block number, Focus, Speed) may be distributed among the scans as follows:

(i) Y Location and Speed

In scans 0, 3, 5, 7 and 12 the detectors pass over a horizontal (X direction) edge. By measuring the amplitude of the signal in the detectors which observed the edge, the start position of the scan can be determined. If the signal value is large then the detector has spent most of the scan time over transparent parts of the marker. A linear computation such as follows may be used to determine the Y position:

$$Y = Y_o - 15 + 15 V/V_m$$

where
Y is the location, in microns, of the start of a 15 micron scan,
$Y_o$ is the location of the edge
V is the average signal value of elements observing the edge, and
$V_m$ is the maximum possible signal value.

The gaps after scans 2, 3, 5 and 11 indicate positions where a scan is performed and the data discarded because the scan is of a length (along the Y direction) which will in general be different from 15 microns. These shorter and variable length scans are used to achieve synchronization. Their lengths are determined by the difference between the observed Y location and the desired Y location, so that the next scan begins at the optimum position They are required because devices such as the CCD 111 are continuously influenced by incident light; they have no shutter.

It will be observed that poor optical focus will affect Y position calculations,. but this effect diminishes as the scan is more accurately centred over the edge.

By successive measurements of Y position, and a knowledge of the time of those measurements provided by clocks attached to the microprocessor computing the Y positions, a determination of the speed of Y movement can be made.

Scans 6 to 11 observe the opaque triangle 84 in the centre of the marker. By counting the number of detectors covered by that triangle (identified by their low signal level) the Y location may also be predetermined. Note that the use of 45 degree angles in the triangle shape means that the width of the triangle diminishes at exactly twice the relative speed in the Y direction. Such simple relationships simplify the analysis of the marker: in general, each triangle 84 provides a pair of relatively divergent edges also available for reference in determining the speed of travel of the read head over the medium parallel to the associated channel.

(ii) X Location and Magnification

Scans 1, 2, 4, 5 and 6 scan parts of the marker whose width (span in the X direction) is equal to that of 32 bits (scans 1 and 2) or 64 bits (scans 4, 5, 6). These scans do not cross any horizontal edges and may be used to determine the X location of the channel, and the optical magnification or expansion or contraction, if any, of the medium and hence the number of detectors expected to be exposed by a single bit. It is significant that these parts of the marker are at least somewhat larger than a bit in the X direction and have boundaries 81a, 81b, 82a, 82b, parallel to the channels, and that the distance between these boundaries relative to the centre-to-centre spacing of bits is known accurately. The respective scans may thereby employ the part of the marker viewed to assess any variation in either the physical size of the medium, or the observing apparatus, which is equivalent or similar to changes in the size of the medium.

With the exemplary dimensions previously given, it will be noted the aforesaid distances between boundaries 81a, 81b and 82a, 82b are each an integral multiple of the centre-to-centre spacing of the data bits 26. Moreover, that number is 2 raised to the power of an integer, i.e. $2^5$ and $2^6$ respectively. Such relationships simplify calculations: the $2^n$ relationship in particular allows ready division by a microprocessor, by a simple right shift operation, and so permits a substantially faster analysis.

For instance, suppose that in scan 4, the detector element with the lowest number (i.e. the leftmost element) whose output exceeded a lower threshold was element 86 while the element with the highest number and similarly high output level was numbered 206. Then the centre of the channel is located on detector number 146, and the number of detectors per bit is 120/64 = 1.875. Since the first data bit in a frame is in bit position 13, i.e. 50−13 = 37 bits left of centre, the detector nearest that bit position will be number 77 [146−(37×1.875) = 76.62].

Note that the detector elements such as those in the Fairchild CCD 111 have inert strips separating the sensitive elements which may cloud the definition of the number of detector elements per bit. The computation performed here ignores the thickness of the inert strips, and in general arrives at a non-integral value such as 1.83 detectors per bit. This number is vital to the algorithms extracting data from the frames in accordance with the aforementioned international patent application. Without it, a bit may easily be assigned to a position within the frame of data, i.e. a significance, different from that intended.

(iii) Block Number

Scan 2 scans the binary block number value. The microprocessor determines the block number by noting the signal level of the detector element(s) at the middle of each line 76. If the signal level exceeds half the signal level of the elements observing the transparent parts on either side of the block number, the bit may be taken as a 1, otherwise it is a zero. The detector elements to be examined would be computed assuming no variation in optical magnification or medium size from nominal values. Because each line covers four detector elements, and there are only 12 bits to extract, these simplifications will, in general, be satisfactory.

(iv) Skew

Scans 3, 7 and 12 observe edges which are relatively long or comprise spaced co-linear edges. Any difference between the Y position determined by detector elements on the left hand side of the edge, and that determined by elements observing the right hand side, indicates that the marker edge is not parallel to the line of the detector elements (ignoring any mirrors, prisms or other optical apparatus able to bend rays of light). This lack of parallelism may be referred to as the Yaw angle or Skew of the data in the medium with respect to the observing apparatus. Action such as movements in the X direction during a Y motion pass along a channel may be required to compensate for the skew. In extreme cases the angle may be so great that reliable data extraction is not possible and the medium must be re-registered to reduce the skew angle.

(v) Detector Output Magnitude

Scan 4 observes a part of the marker containing a wide transparent panel i.e. of an extent in any direction at least somewhat greater, and preferably substantially greater, than a bit. The detector elements observing the panel will be fully exposed, and this part of the marker may thus be employed for assessing the maximum value to be expected from the observing apparatus. The resulting output levels may be used to adjust either the supply voltage for any illuminating apparatus, or the gain of any circuit amplifying the output signals, or both.

(vi) Focus

Scans 9, 10 and 11 observe the vertical lines 78a in the upper, widest section of marker 30. The signal level of detector elements observing these opaque lines will receive contributions from surrounding transparent lines, to an extent determined largely by the focus of the optical system transporting light from the marker to the sensor array. If the focus is bad then the lines will be largely blurred and an element positioned to observe an opaque line will have a relatively high signal level compared to that obtained when the optical focus is optimum. A Modulation Transfer Function (MTF) may be derived which is 1.0 under perfect conditions and 0 when complete blurring occurs If the MTF is below a predetermined level then extraction of data may be too unreliable to be attempted, and the system must be adjusted. Detectors such as the Fairchild CCD 111 inherently contribute to the reduction of the MTF.

It is important that determination of focus be unaffected by the relative positioning of detectors with respect to the lines If an integral number N of detectors observes the space between the centre of one line and the centre of the next, then the signals from each group of N detectors observing the lines are the same in any one observation However they would vary from one observation to the next depending on whether detector edges were aligned with line edges or not. This dependence on the "Fractional" alignment may create problems in accurately determining the focus, or Modulation Transfer Function (MTF).

Figure 5:
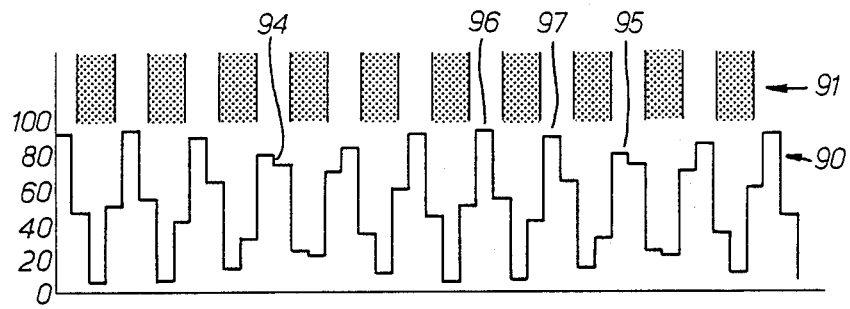
FIG. 5 is a diagram to assist explanation of the rules concerning the lines in markers used to measure focus.

FIG. 5 shows the output values 90 of detector elements observing lines 91. A simple method of measuring the MTF is to obtain an indication of maximum and minimum values, MAXV and MINV, by adding output values of 2 or 3 selected detector elements for each, and computing MTF = (MAXV−MINV)/(MAXV+MINV). Examining the different shaped peaks 94 and 96 in FIG. 5, it will be appreciated that an algorithm for selecting detector values which worked well for peak 94 (e.g. add the two highest points together) would not work so well for peak 96.

When the number of detectors observing the space between two line centres is a whole number, then each peak in any one observation has the same shape. However if, as is shown in FIG. 5, the number of detector elements observing the said space is a non-integral number R, then the peak shape will change from one peak to the next. If the MTF is taken as the average of MTF measurements on a series of peaks, and the detector element selection algorithm is chosen to provide the most accurate value for such an average, then the computed average MTF will be independent of the relative position of the detector elements and the lines, provided that the shapes of the peaks observed are uniformly distributed over the range whose end points are exemplified by peak 94 and peak 95 in FIG. 5. In these peaks the centre of the line falls at uniformly distributed distances from the centre of the nearest detector. This arrangement may be achieved by setting ΔR, the fractional part of R (i.e. R-N or MOD(R,1)) as follows:

$$\Delta R = m/n$$

where
n is the number of lines being observed in the respective group 78, and
m is a small integer, e.g. 1, 2, 3.

In the case where the centre to centre spacing of the areas observed by successive detector elements is half the centre to centre spacing of data entries 26, then determination of the MTF is simplified by setting the centre-to-centre spacing d of lines or bars 78a according to the following formula:

$$d = c(2 + m/n)$$

where
c is the centre-to-centre spacing of the data entries 26
m is a small integer, e.g. 1, 2, 3, and
n is the number of lines in the respective group 78.

As discussed, the location of marker 30 on the fiche is precise with reference to the succeeding channel block or segment. The reader is programmed with the expected displacements previously outlined and has accordingly now made necessary adjustments and knows where to find the X-Y co-ordinate of the associated channel block. Synchronization with reference to the channel is complete, and certain other parameters important in subsequent analysis of the data contained in the block are stored in memory.

Figure 6:
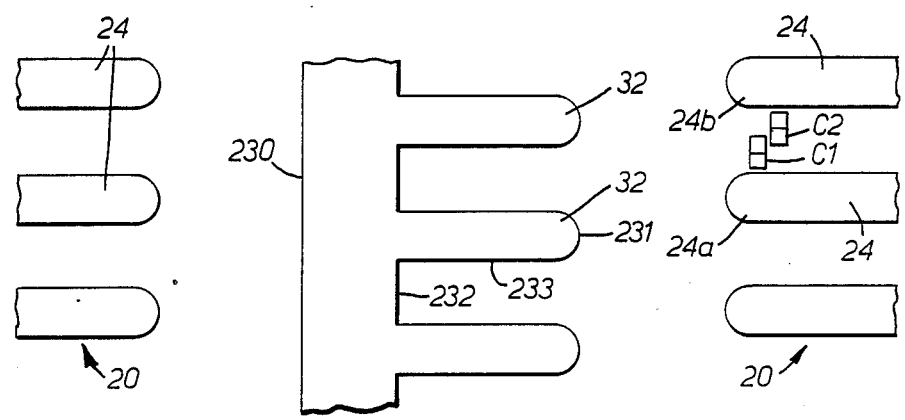
FIG. 6 is an enlarged view of part of FIG. 1B, highlighting a frame synchronization marker.

FIG. 6 is an enlargement of a small representative portion of FIG. 1B showing three connected frame synchronization markers 32 and their physical relationship to respective frames 24a, 24b of the adjacent channel 20. The detector element array or read head scans marker 32 on a short scan after it has scanned frame 24a and before it commences a scan of the next frame. Small rectangles C1 and C2 indicate the position of the detector element array at the start and finish of the marker scan: it will be noted that the array is well clear of both frames during this short scan.

The marker is designed to provide its useful information, X and Y locations of the first bit of frame 24b, within the Y span of the C1-C2 scan. On the other hand, it is desirable that edges providing the information extend over several detector element positions (preferably at least three) in the X direction and appear to be of substantially infinite extent in the Y direction. Each illustrated marker 32 therefore provides a wide vertical bar bounded by the vertical line 230 and the broken vertical line 232, with a narrower horizontal bar extending from line 232 to end 231. The lower edge 233 of this bar is positioned so that it is observed by the scan c1-c2. It is desirable that edge 233 be located substantially midway between the adjacent frames, since the scanning of the marker should be centred on that edge. It is also desirable that the left edge 230 be straight, although some variation may be able to be accommodated, and that it begins a zone which is wider than the centre-to-centre spacing of said data entries. A contrary wish is that there be breaks in the vertical edge 230 so that detector elements observing the vertical line to right of that edge do not saturate and affect their neighbours as a result. These two opposing constraints need to be balanced in a way dependent on the characteristics of the detector used.

The appendix sets forth a FORTRAN program for the steps involved in the short scan of each frame synchronization marker 32. Comments following exclamation points (!) or C in the first column explain its operation. It is provided with the output values of a linear array of detector elements in array D, and a set of constants in array K. In addition the value in variable X is both the approximate position of the left hand side of the marker before processing, and the accurate position of it afterwards. Besides producing X, the subroutine produces T which is the length of time to be allowed for the scan of the frame which follows the minor marker.

The program begins by checking that there is an absence of the marker shape at the left hand side of the position X. This is indicated by the outputs D(IX-5) and D(IX-4) being low values so that their sum is less than K(1). The program then searches from the left for the start 230 of the marker which is indicated by large signal values so that the sum of two adjacent detector element outputs exceeds K(2). A failure on either count results in a call to an error subroutine which might instruct the routine calling PERFRAME to ignore the values returned.

Having found the approximate position of the left edge 230 of the marker, the routine searches for the point where the slope is the greatest by taking a position, computing the slope, comparing that slope with the last slope, and advancing to the next position and repeating the process if the slope is still increasing. The slope is computed by subtracting the outputs of two leftmost detector elements of a group of 4 from the sum of the other two (rightmost). When the slope decreases, the point of greatest slope has just been passed.

The X position is then computed by summing the detector element number at which the slope decreased, a constant, and a factor linearly related to the output values for the 4 detector elements spanning the edge. The Y position is given by a similar factor which is linearly related to outputs of elements observing the horizontal (X axis) component of the frame synchronization marker at a specific distance to the right of the left edge 230 of the marker.

It will be appreciated that the searching part might be skipped if there is more confidence in the accuracy of the guessed position (prior prediction) of the X position. This is indicated by K(8) being zero, and might result, for example, from techniques in accordance with the second aspect of the invention.

Figure 7:
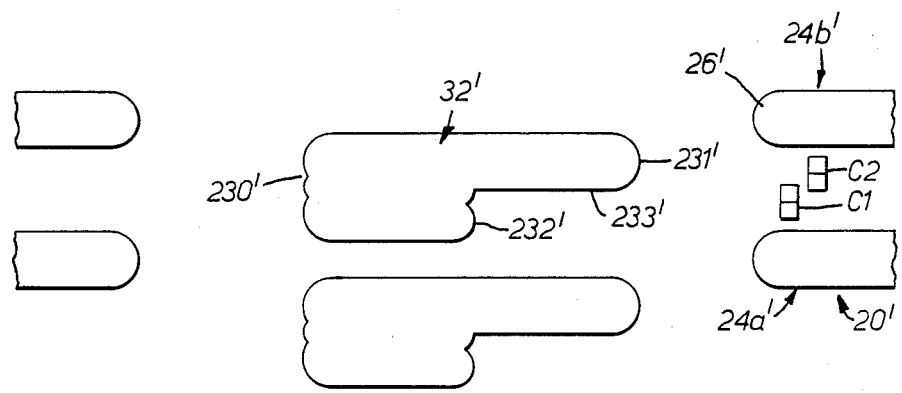
FIG. 7 is similar to FIG. 6 but shows an alternative form of frame synchronization marker.

FIG. 7 depicts an alternative form of frame synchronization marker in which like features are highlighted by like reference numerals. In this case each marker is defined by a pair of horizontal bars, one shorter than the other to form a step 232'. Edges 230', 231' and 232' are parallel to the channel at prescribed displacements, parallel to the frame, from the first data entry 26' in frame 24b'. Edge 233' is at an exact Y location between frames, i.e. parallel to and at a predetermined distance from the frame 24b'. This alternative form is suitable where it is desirable to break the left edge 230 (e.g. where focus is poor) or where the writing device can better handle X-axis bars than long Y-axis bars.

In the aforedescribed techniques of achieving synchronization of the microfiche frames and the read head, any individual position marker, such as either of the characterizing edges 230, 233 of markers 32 or any of the several analysed edges of markers 30, is susceptible to drastic local modification. Typical causes of such modification, especially given the size of markers 32, are dust specks, condensation, scratches, soiling, or other like "weathering". These will result in "spot errors", in the medium which may be sufficiently large not to be eliminated by simple averaging of multiple measurements along an edge but which might cause the reader controller to raise a major error flag and cease reading. As discussed earlier in the specification, such would be the traditional outcome.

In accordance with the second aspect of the invention, however, there is provided a technique, somewhat stochastic in nature, by which local errors in position markers can be distinguished from true indications of position errors and the effect of the observed value reduced. The technique essentially comprises observing and storing a predetermined number of successive values, in this case position indicating values, determining whether each observed value is outside a selected trend established by the stored values by more than a predetermined margin, and, if so, reducing the effect of that value—typically by rejecting it.

By way of example, consider the case where synchronization markers 30, 32 are being read and analysed under microprocessor control, with a microfiche layout as in FIGS. 1A and 1B, a reader configuration as in FIG. 2, and a control circuit substantially as in FIG. 4. The position for the first bit in the leading frame of the first channel is determined by analysis of the preceding channel synchronization marker (30 in FIG. 1A), as described above. This position is stored at all ten (say) sites in a First-in-First-out (FIFO) buffer register, sometimes referred to as a SILO. Marker 30 is sufficiently large and adequately scanned so it is able to be observed with greater confidence in the observation than in the case of the much smaller markers 32, simply because the large marker provides the opportunity for repeated observation. The initial position stored in the FIFO buffer thus sets the initial trend required to practice the invention.

Figure 8:
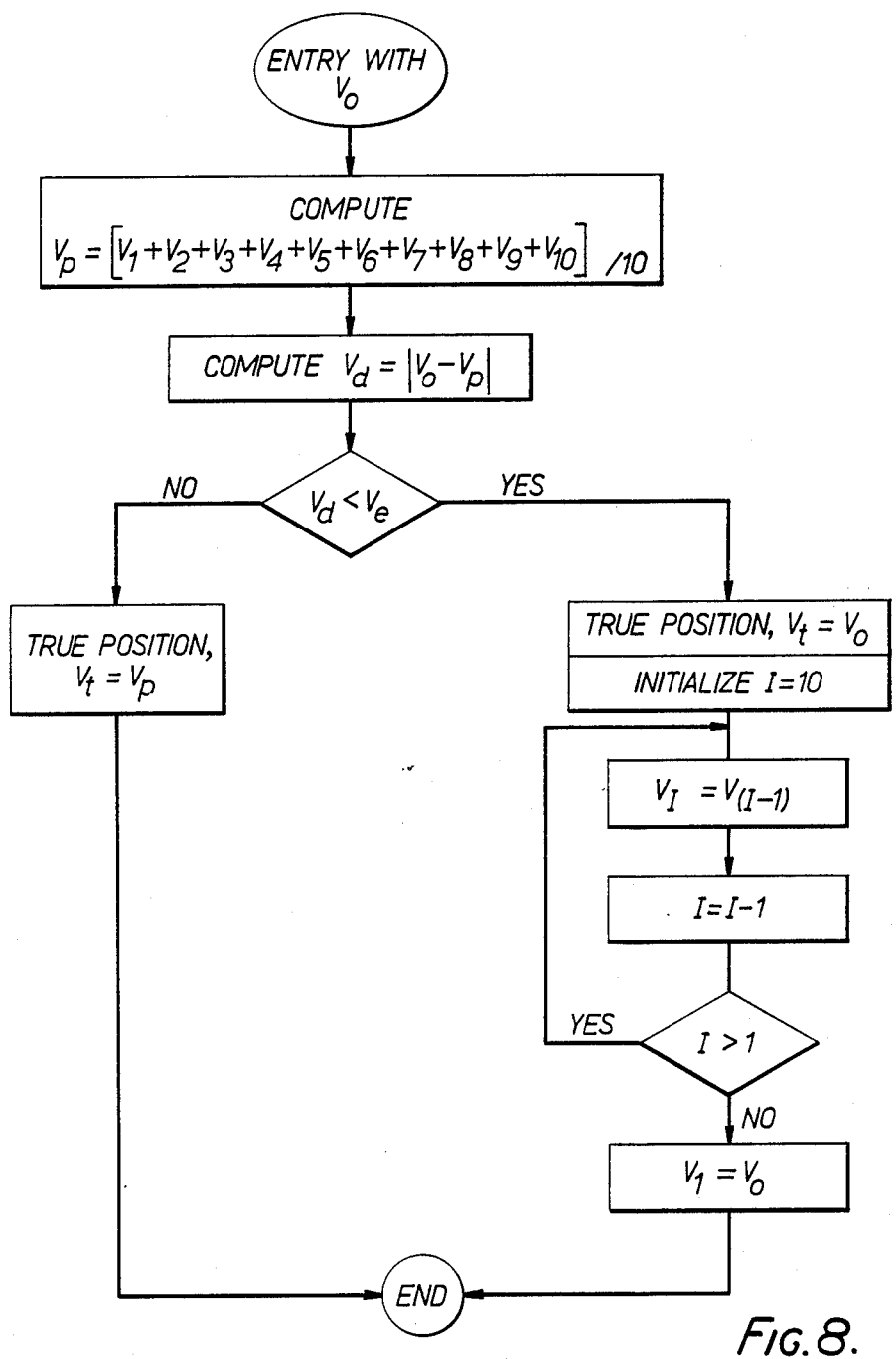
FIG. 8 is a flow chart for performing part of an embodiment of the second aspect of the invention.

As the read head travels up the channel, the successive frame synchronization markers (32 in FIGS. 1A and 6) are analysed, also as already described, to check the aforesaid position. The dangers of relying too heavily on a reading of any one marker 32 are avoided by practising the second aspect of the invention by way of the steps set out in the flow chart of FIG. 8, in which $V_n$ is the observed value at position n, in this case position marker n.

The initial equal values in the FIFO buffer obtained from marker 30 are replaced in sequence by subsequent observations so that the set contains the latest ten observations. After each updating, the processor computes 250 the simple average $V_p$ of the stored values and treats this as an established trend with respect to which the currently observed value $V_o$ is compared 252. If $V_o$ exceeds $V_e$ by more than a predetermined margin 254, then $V_p$ is disregarded and the true value $V_t$ is taken as the predicted value $V_p$ 256. If not, then $V_t$ is set as $V_o$ 257 and the cycle proceeds.

This approach, relying on a trend established with some confidence by analysis of each marker 30 at the head of each channel, can be employed to reduce the analysis of marker 32 by bypassing the searching aspects of the analysis previously described. The latter analysis may instead employ an X position value for edge 230 derived from an analysis of a trend for that X position, said trend having been established by analysis of X position indications from marker 30, and been continued by X position indications from a series of markers 32. The marker 32 is then observed in accordance with the second aspect of the invention, the trend initially comprising the trend for the X position just mentioned.

Figure 9:
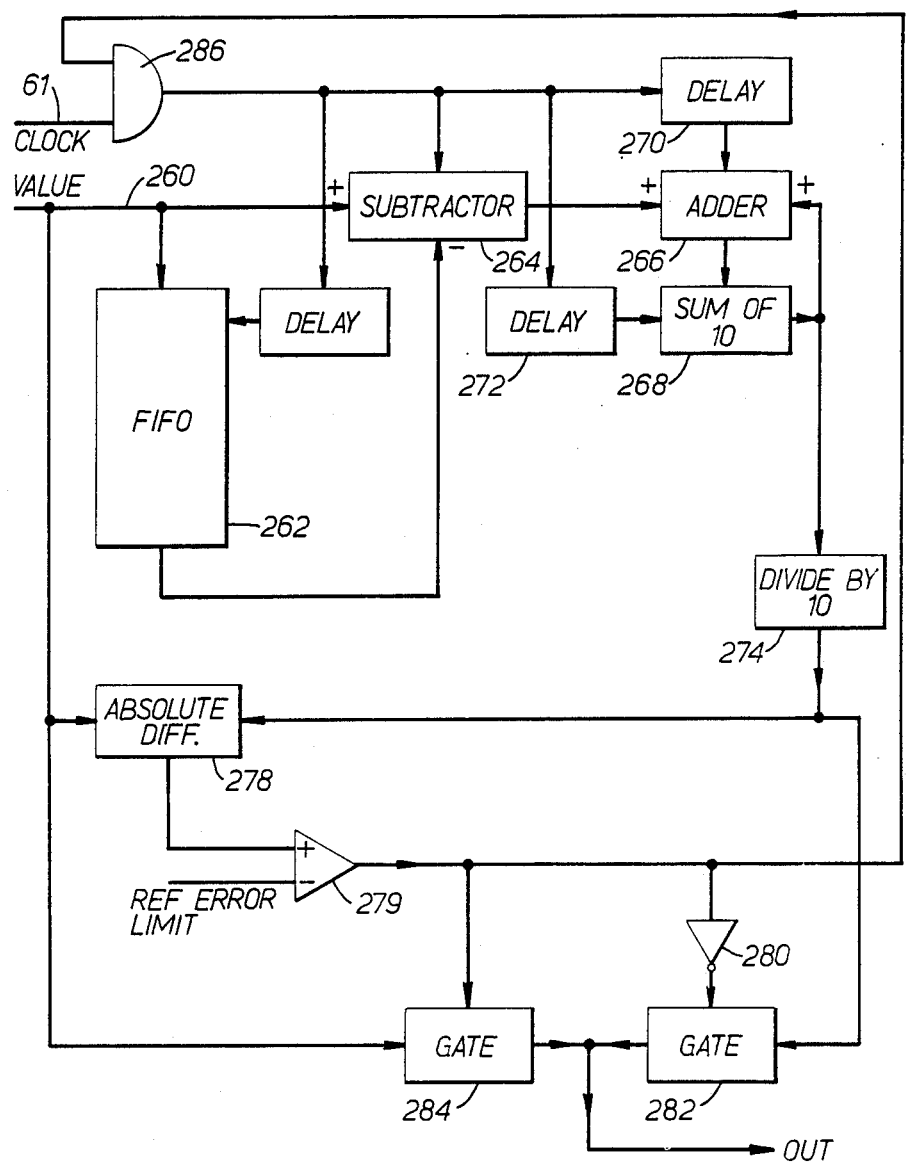
FIG. 9 is a block circuit diagram of part of an embodiment of the second aspect of the invention, implemented in a digital circuit.

FIG. 9 shows a simplified representation of an electronic arrangement, which could be either analog or digital in nature, for computing the average of the last 10 values, and comparing each new value with that average. Each value 260 representing a position is presented to the FIFO buffer 262 and subtracter 264 which also receives the output of FIFO 262. The output of subtractor 264 is applied to adder 266, the output of which is applied to sum of 10 register 268. The output of sum of 10 register 268 represents the sum of the previous 10 values, since adder 266 produces the total of the previous sum of 10 values and the extent to which the newest value alters the sum of 10 values (as received by subtractor 264).

The average of the previous 10 values is produced by the "Divide by 10" circuit 274, and is compared with the most recent value by the subtractor 278 which produces a positive signal equal to the modulus of the difference. Provided that the modulus is less than a prescribed error limit, then the output of a further comparator 279 will be true, so that the gate 286 will allow the clock signal to enable the additions and subtractions provided by the adder 266 and subtractor 264, and thereby update the sum of 10 value with the newly arrived position value. In this case, where the output of comparator 279 is true, the received value 260 is presented at the output by a gate 284. However, if the signal 260 exceeds the error limit, then the output of the comparator 279 will be false, in which case the sum of 10 register will not be updated, and the output from the divide by 10 register 274 will be presented at the output by a gate 282. Obviously adder 266 must not operate until subtractor 264 has operated and register 268 must not be clocked until adder 266 has been operated. Accordingly, delays 270 and 272 are provided with delay 270 being greater than delay 272.

Figure 10:
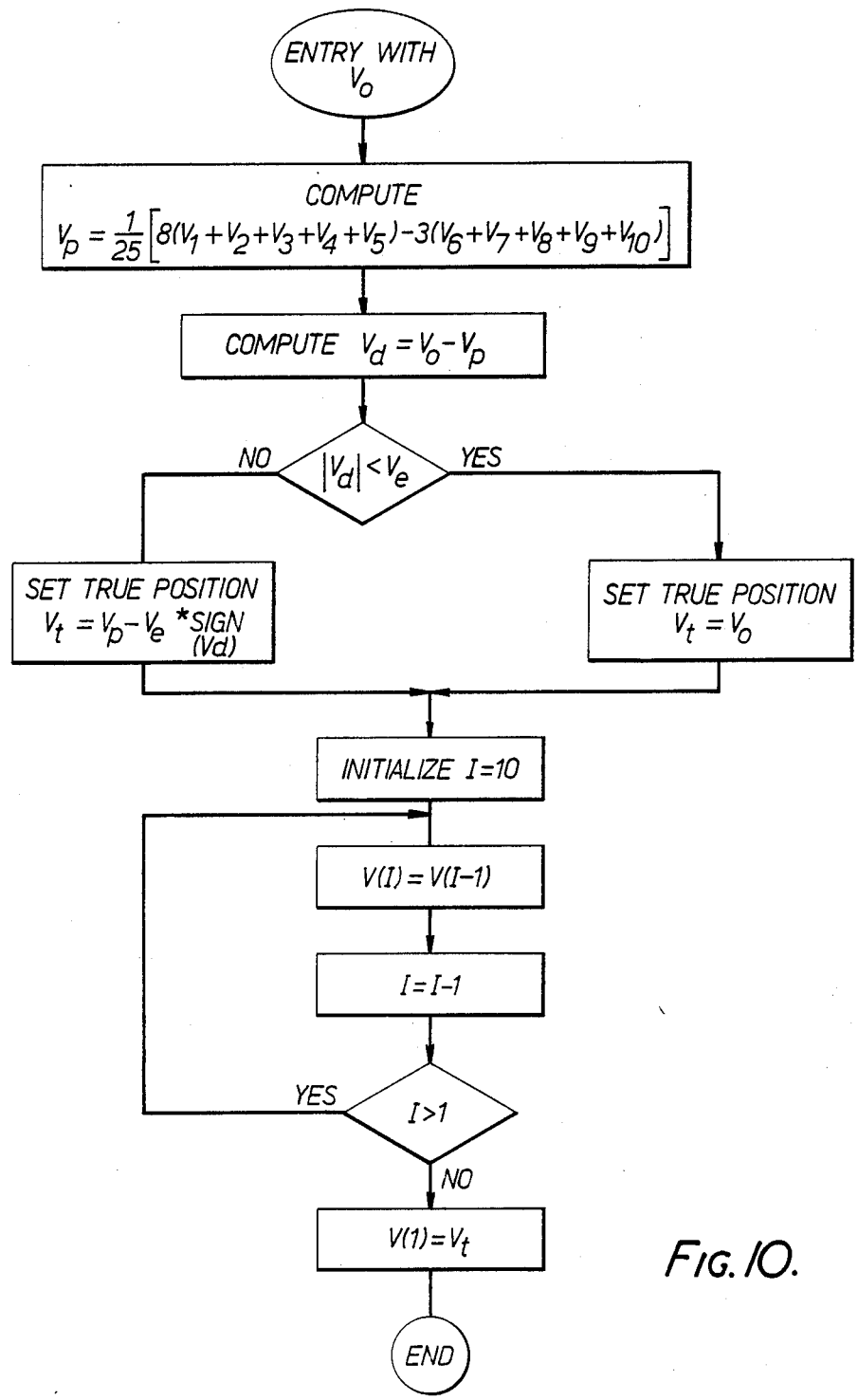
FIG. 10 is a flow chart corresponding to FIG. 8 but in respect of a still further embodiment of the second aspect of the invention.

In a variation, a higher order trend is obtained by computing an average of the stored values in which weights, positive or negative, are assigned to the values according to their age. FIG. 10 is a flow chart for an example of such a variation, in which the predicted value $V_p$ is $8/25(V_1+V_2+V_3+V_4+V_5)-3/25(V_6+V_7+V_8+V_9+V_{10})$. Here a linear trend is computed as $V_p$, and the difference, $V_d$, between the observed position $V_o$ and the predicted position $V_p$ is calculated.

If the magnitude of $V_d$ exceeds an error limit $V_e$ then the true position is taken as a position $V_e$ units from $V_p$ in the direction towards $V_o$ (but not as far). In effect the magnitude of the deviation from the predicted path has been limited.

With trends other than simple averages it is necessary in general to update the stored values even when a position observation has been reduced in effect, least the linear or other trend be left unprogressed at the next observation. FIG. 10 shows that, in this case, the stored values are updated regardless of possible error in the position value.

In general, the second aspect of the invention is especially applicable where:

(a) The accuracy of the location of the data on the medium is greater than the accuracy of the reading device;

(b) any mispositioning will normally be a result of incorrect mechanical movement within the reader, specifically of the medium with respect to the read head;

(c) because mechanical movements are slow in comparison with electronic speeds, and because new media must be of high density and transfer rate to be competitive, the mispositioning during the time between transfers of a small number (say less than 100) of bytes should be small, and be considerably smaller than that required to cause a data error; and (d) if a significant mispositioning is reported after a series of closely spaced position reports indicating correct or adequate positioning, then the reporting of the mispositioning is likely to be in error.

APPENDIX

FORTRAN Program for scanning and analysis of each marker 32.

```
Subroutine PERFRAME(D,K,X,T)
C
C   PER FRAME analyses the Per-Frame marker, assuming
    256 detector
C   element output values in array D, various constants in
    array K,
C   and an approximate starting position in X.
C   It produces values X specifying the detector number of the
C   left edge of the marker, and T, the time until the end of the
C   scan of the frame which is proceeding during the analysis.
REAL D(256),K(8),LSLOPE
IX = INT(X + 0.5)              ! Get nearest Integer to X
I = IX                          ! In case K(8) = 0
IF(K(8).EQ.0) GOTO 40           ! Skip search part for speed
LSLOPE = 0                      ! Preset slope to zero
IF( (D(IX - 5) + D(IX - 4)).GT.K(1) )
THEN CALL ERROR(1)
C
C   Expect opaque space at start of 10 element range about X.
C
DO I = IX - 3,IX + 5            ! Scan 10 elements about X
IF ( (D(I) + D(I + 1)) G.T.K(2) ) GOTO 20 ! Found Start
END DO ! I = X - 3,X + 5
CALL ERROR (2)                  ! Start must be in range
I = I + 1                       ! Step along element
SLOPE = D(I) + D(I - 1) - D(I -2) -D(I - 3) ! d(signal)/dx
IF (SLOPE.GT.LSLOPE) THEN       ! Slope still increasing
LSLOPE = SLOPE                  ! Remember new value
GOTO 20                         ! Try Next Element
END IF ! Slope > L(ast)Slope
C
C   If we get here, we have just passed the point of
    maximum slope
C
40  X = K(3) + I + K(4)*( D(I - 1) + D(I - 2) + D(I - 3) +
    D(I - 4) )
    I = INT(X + K(5))
    T = K(6) + K(7)*( D(I) + D(I + 1) + D(I + 2) +
    D(I + 3) )
    RETURN
    END
```

What is claimed is:

1. An information storage medium in which information is stored as multiple machine readable binary data entries arranged in frames aligned in one direction, which are themselves arranged in plural generally parallel channels aligned in another direction, said medium including first machine readable synchronization markers respectively positioned at at least one end of each said channel, which markers include features characteristically located on the medium at respective positions which, for successive channels, are precisely known with respect both to the first frame of the respective associated channel and to the first data entry of that frame;

wherein each said first marker includes first edges including at least two edges parallel to and at predetermined distances form the center line of the first frame of the associated channel, and second edges including at least two edges parallel to the channel at predetermined distances, measured parallel to the first frame, from the data entry of that frame;

wherein each of said first and second edges has a length at least three times the extent of a data entry in that direction.

2. A medium according to claim 1 wherein said first edges of each said first marker parallel to said first frame include a pair of spaced co-linear edges for reference in determining the orientation of the medium.

3. A medium according to claim 1 wherein each said first marker includes a part of an extent in any direction somewhat greater than a data entry, for references in assessing the maximum value to be expected from observing apparatus.

4. A medium according to claim 1 wherein said first synchronization markers are further positioned at intervals along the respective channels.

5. A medium according to claim 1 further comprising second machine readable synchronization markers arranged in respective sets alongside channels, each second marker being respectively positioned with respect to a frame of data entries and including features characteristically located on the medium with reference to that frame.

6. A medium according to claim 5 wherein each said second marker includes at least one edge parallel to and at a predetermined distance from the center line of the associated frame, and at least one further edge parallel to the channel at a predetermined distance, measured parallel to the frame, from the first data entry of the frame.

7. A medium according to claim 6 wherein said at least one edge is positioned substantially midway between the center lines of the nearest frames.

8. A medium according to claim 6 wherein said second marker has an edge parallel to the channel which begins a zone which is wider than the center-to-center spacing of said data entries.

9. An information storage medium in which information is stored as multiple machine readable binary data entries arranged in frames aligned in one direction, which are themselves arranged in plural generally parallel channels aligned in another direction, said medium including first machine readable synchronization markers respectively positioned at at least one end of each said channel, which markers include features characteristically located on the medium at respective positions which, for successive channels, are precisely known with respect both to the first frame of the respective associated channel and to the first data entry of that frame;

wherein each said first marker includes a pair of relatively convergent or divergent edges for reference in determining the speed of travel of the read head over the medium parallel to the associated channel.

10. An information storage medium in which information is stored as multiple machine readable binary data entries arranged in frames aligned in one direction, which are themselves arranged in plural generally parallel channels aligned in another direction, said medium including first machine readable synchronization markers respectively positioned at at least one end of each said channel, which markers include features characteristically located on the medium at respective positions which, for successive channels, are precisely known with respect both to the first frame of the respective associated channel and to the first data entry of that frame;

wherein each said first marker includes a part which is somewhat larger than each said data entry in the direction parallel to the frames and has boundaries parallel to the channels, the center-to-center spacing of the data entries being known accurately, whereby said part of the marker is suitable for reference in assessing any variation in either the physical size of the medium, or the observing apparatus which is equivalent or similar to changes in the size of the medium;

wherein said boundaries parallel to the channels are separated by a distance which is an integral multiple of the center-to-center spacing of the data entries.

11. An information storage medium in which information is stored as multiple machine readable binary data entries arranged in frames aligned in one direction, which are themselves arranged in plural generally parallel channels aligned in another direction, said medium including first machine readable synchronization markers respectively positioned at at least one end of each said channel, which markers include features characteristically located on the medium at respective positions which, for successive channels, are precisely known with respect both to the first frame of the respective associated channel and to the first data entry of that frame;

wherein each said first marker includes an arrangement of uniformly spaced parallel lines or bars for reference in determining the optical focus of the read head/medium system in terms of a modulation transfer function;

wherein the lines or bars are parallel to the channels and their centers are spaced at intervals d given by $d = c(2 + m/n)$ where c is the center-to-center spacing of the data entries, m is a small integer, and n is the number of said lines or bars.

12. A method of ascertaining the position of detector means with respect to multiple machine readable data entries arranged in frames aligned in one direction, which frames are themselves arranged in plural generally parallel channels aligned in another direction first machine readable synchronization markers being respectively positioned at at least one end of each channel, comprising the steps of:

observing the full extent of each first marker in said one direction with the detector means as it travels substantially in said other direction;

outputting a signal representative of the observation;

effecting said ascertainment of position by analyzing each observation to identify any response in that observation to features of the first markers which are characteristically located with respect to the associated channels; and observing one or more groups of uniformly spaced lines or bars in said first markers to provide a good indication of the quality of focus of an image of said machine readable entries on said detector means.

13. A method according to claim 12 wherein the distances from the center of each of said lines or bars to the center of the nearest area observed by an element of a uniform linear detector array for said observing, are distributed evenly over the possible range, and wherein the measurement is taken as the average of measurements computed from the outputs of elements observing each line over the range.

14. A method according to claim 12 further comprising the step of observing second machine readable synchronization markers arranged alongside the respective channels and maintaining synchronization by reference to one or more features of the second markers which are characteristically located in relation to respective frames of the adjacent channel.

15. A method according to claim 14 further comprising the step of obtaining an observed position value for each second marker in turn, determining whether the observed position is outside a trend initially established by observations of markers such as those at the leading ends of channels and maintained by observations of said second markers, by more than a predetermined margin, and if so, reducing the effect of that observed position value.

* * * * *